Patented Sept. 13, 1938

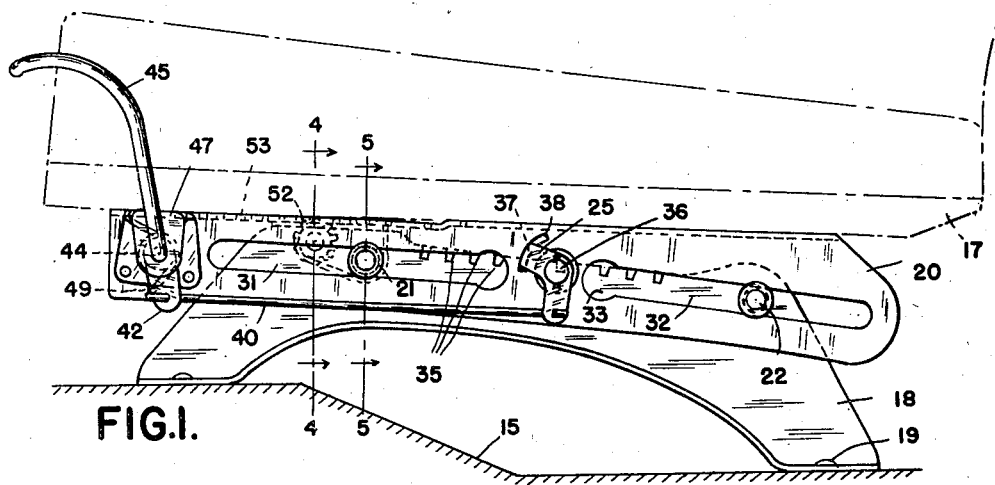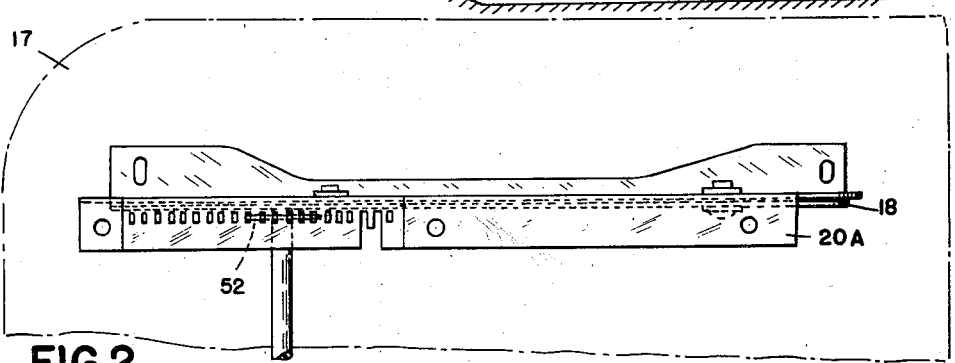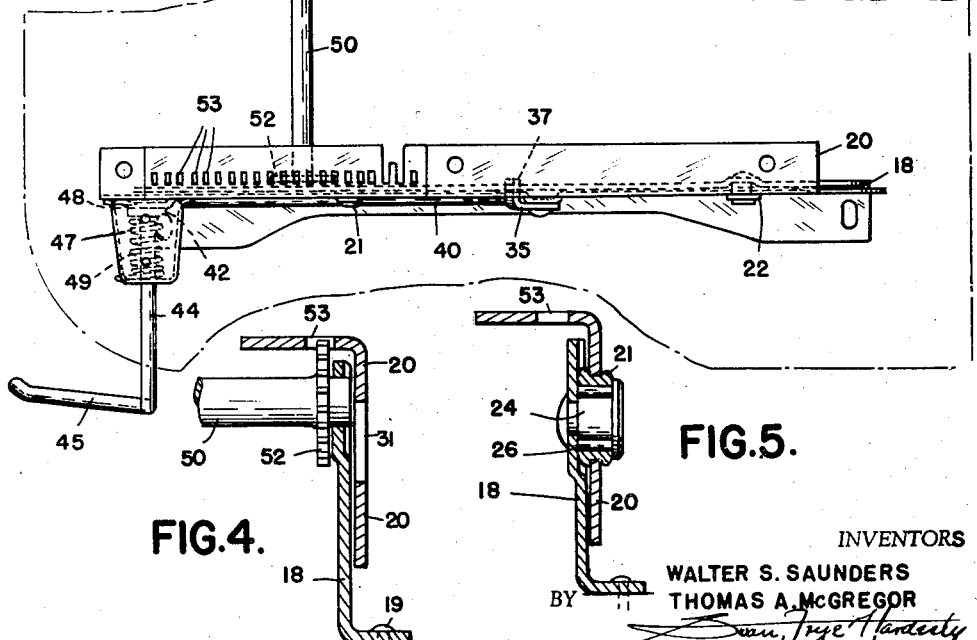

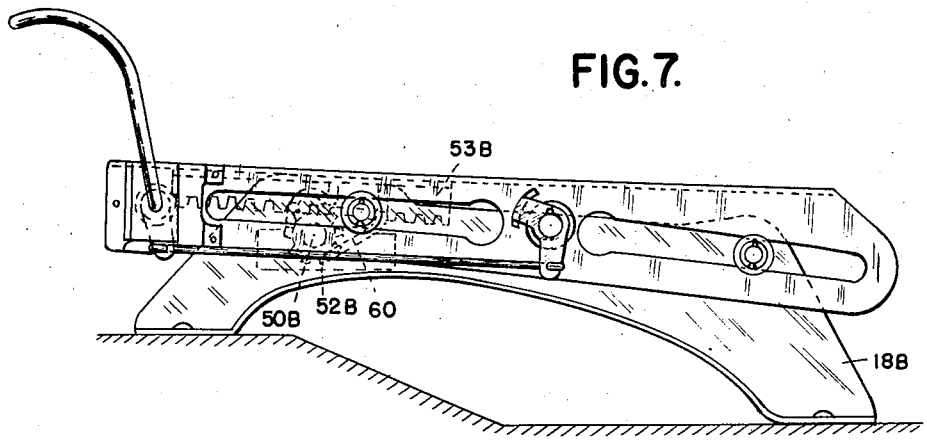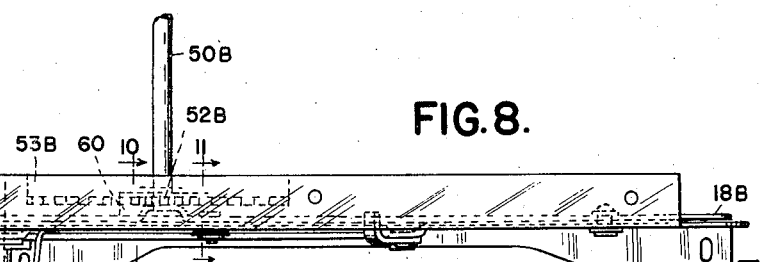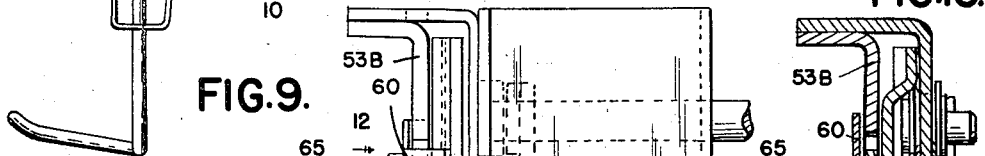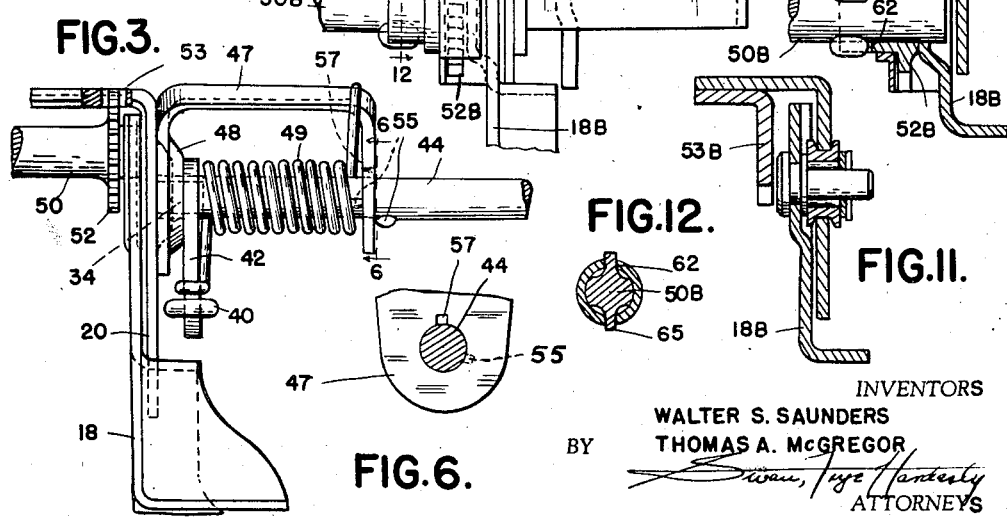

2,130,159

UNITED STATES PATENT OFFICE 2,130,159

SEAT SUPPORT

Walter S. Saunders and Thomas A. McGregor, Pontiac, Mich., assignors to American Forging & Socket Company, Pontiac, Mich., a corporation of Michigan Application November 9, 1936, Serial No. 109,658

4 Claims. (Cl. 155—14)

This invention relates to improvements in the construction of adjustable supports, such as are employed to support vehicle seats and the like. The primary aim of the invention may be summarized as being to provide improved and simplified means whereby such a seat may be rigidly held in any one of a plurality of positions, and quickly and easily moved from one to another of such positions.

An important object of the invention also resides in the provision in conjunction with a pair of such supporting assemblies, one adapted to be used under each end of a seat, of cross connecting means constructed and installed in an improved manner to force the two supporting assemblies and so both ends of the seat to move in unison.

Another important object resides in the provision of simplified supporting means of the character indicated, such supporting means comprising a plurality of unitary assemblies each incorporating a supporting track element and a carriage element, such elements being of extremely simple and rigid construction and slidably interconnected by anti-friction means serving also to prevent separation thereof and to limit the travel of one with relation to the other, said anti-friction means being journaled upon axes fixed with relation to one element and rollable with relation to the other.

Further objects include the provision of improved means for insuring uniform and parallel movement of a plurality of such assemblies arranged in spaced relation beneath a seat to support the same, and for so interconnecting said assemblies that they may be separately shipped and installed.

Other objects and advantages will be apparent from the following description wherein reference is made to the accompanying drawings illustrating the preferred embodiments of our invention and wherein similar reference numerals designate similar parts throughout the several views.

In the drawings:

Figure 1 is a side elevational view of a seat supporting assembly incorporating the principles of this invention, diagrammatically indicating a seat carried thereby.

Figure 2 is a plan view thereof, with the cross shaft partly broken away.

Figure 3 is a front elevational view of one of said supporting assemblies, fragmentarily showing a detail of the locking mechanism.

Figures 4 and 5 are detailed cross sections taken substantially on lines 4—4 and 5—5 respectively of Figure 1, and looking in the direction of the arrows.

Figure 6 is a detailed cross-section taken substantially on the line 6—6 of Figure 3, and looking in the direction of the arrows.

Figure 7 is a view similar to Figure 1 of a somewhat modified construction.

Figure 8 is a top view of such modified assembly.

Figure 9 is a front elevational view similar to Figure 3.

Figures 10 and 11 are cross sections taken substantially on the lines 10—10 and 11—11 of Figure 8 and looking in the direction of the arrows.

Figure 12 is a detailed cross section taken substantially on the line 12—12 of Figure 9 and looking in the direction of the arrows.

Referring now to the drawings, reference character 15 designates a vehicle floor, upon which, it is assumed for illustrative purposes, a seat 17 is desired to be adjustably supported. To the bottom of the seat, one near each end thereof, are rigidly secured a pair of carriage members as 20—20A. These are of similar but oppositely disposed construction, and a description of one thereof will accordingly suffice for both, although, as will be seen upon inspection of Figure 2, only one carriage (as 20) need be provided with locking mechanism. A track member 18 is provided for each carriage, the track members being shaped to conform to the configuration of the floor, which in the illustrative instance is higher at the front than the back. Each such track member incorporates a base flange secured to the floor by carriage bolts 19, and an upright web carrying near its front and rear extremities rollers, as 21—22, the rollers journaled upon fixed pins comprising heavy shouldered rivets 24, with interposed anti-friction means in the form of needle bearings 26.

The carriage member is also of angular form, with one web fastened to the bottom of the seat, and a downwardly extending web which overlaps and outlies the track element to which it is adjacent, and is provided with slots as 31—32 engaging the rollers 21—22, to rollably support the carriage and seat. The rollers are preferably grooved to hold the track and carriage members against the lateral displacement. To enable insertion of the rollers, one end of each slot is enlarged, as at 33.

By disposing the slots 31—32 in angular relation to each other, in the manner shown in Figure 1, the seat may be made to tilt farther forwardly as it is moved to the front, and vice versa.

In the top of the track member a plurality of slots 35 are cut. With these a locking dog 25 carried by the carriage is engageable to hold the seat in position, while by rocking the dog to disengage it from the slots, the seat becomes readily slidable to a new position. The dog is rockably mounted upon the pivot pin 36 carried by the face of the carriage, the dog being formed as a bell-crank having an operating nose portion 37 bent to extend through an arcuate slot 38 in the carriage, to such position that it may be swung into and out of engagement with the slots 35 in the top of the track as previously described, while an operating link 40 is articulated to the other arm of the bell crank and comprises a relatively stiff wire, the other end of which is connected to an operating lever 42. The operating lever is secured to and swingable with the handle shaft 44 and is rockable by means of the handle shaft 46, constituting an extension of such shaft.

The handle shaft is mounted in an inverted U bracket 47, having one web welded or otherwise secured to the outer surface of the carriage 20. Apertures for rotatably supporting the shaft are formed in both legs of the U-bracket, and an inwardly projecting boss as 48 may be pressed in the web attached to the carriage, to provide a better bearing for the inner end of shaft 44. Such inner end of the shaft is flattened to receive the lever 42, formed of sheet metal and held thereupon by shaping the aperture therein to conform to the flattened portion of the shaft upon which it is mounted. A spring 49 is coiled about the shaft inside the bracket and acts in torsion upon the handle shaft and upon the dog 25 through lever 42, to urge the dog toward locked position, from which it may be freed by raising the handle.

Where a pair of such supporting assemblies are used, one beneath each end of the seat, they may be connected to insure their unitary movement by means of a cross-shaft as 50 having one end journaled in each track, as best shown in Figure 4, and carrying a gear as 52 fast upon each end and meshing with rack teeth formed upon the carriage, as by punching therein at suitable intervals a series of holes as 53 with which the gear meshes. Force exerted upon the seat near either end when it is desired to slide the same, causes both gears to turn and so both carriages to travel as a unit. The rack apertures may, as shown, be punched directly in the flange of the carriage which also serves to attach it to the under side of the seat.

As shown in Figures 3 and 6, the handle shaft 44 is locked in its supporting bracket 47 by integral tongues as 55 pressed out of and projecting from the surface of the shaft and one located upon either side of the outer web of the bracket. Both tongues are formed upon the shaft before insertion of the shaft, and a slot 57 forming a lateral extension of the aperture in the bracket provides clearance for insertion of the tongue. Slot 57 is located in such position that in the normal rocking movement of the shaft, the tongues cannot become aligned therewith, so that escape of the shaft after its installation by realignment of the inner tongue with the slot is not possible. Movement of the shaft to such extent as to re-align the tongue and slot is prevented by the operating parts after the link 40 is installed, since the slot 38 is of insufficient length to allow movement to this extent.

The modification shown in Figures 7 to 12 inclusive, in which parts analogous to those previously described have been given like reference characters distinguished by the addition of the letter B, the gears 52B which insure alignment of the carriages are journaled in a bracket 60 attached to the inside of each track element 18B, the cross shaft 50B being installable by merely inserting the same in the hub of these gears, into which it loosely fits. The hubs are slotted and project from the bracket 60 sufficiently to be engageable by key portions 65 formed as integral tongues struck up from the surface of the shaft for engagement with such slots. As indicated in Figure 10, the cross shaft 50B is in this construction arranged in a lower position, and a special rack plate 53B secured to the carriage and extending downwardly in alignment with the gear 52 meshes with such gear to provide connection insuring uniform movement between carriage and gear. The rack plate also lies upon the opposite side of the track member from the main web of the carriage, thus preventing lateral displacement of the carriage and track.

The track and carriage assemblies and shafts are by virtue of this latter construction easily shipped separately and in a most compact manner.

What we claim is:

1. Means for slidably supporting a seat or the like comprising an upstanding sheet metal track element, a sheet metal carriage element movably carried by and extending beside the track element, a guide rack portion secured to said carriage element and projecting substantially parallel thereto upon the opposite side of the track element, and means for controlling movement of the carriage including a shaft journaled in the track element, a gear rotatable with the shaft and meshing with the rack portion, and means carried by the track element additionally supporting said gear and overlying said guide rack portion to prevent disalignment of the rack and gear.

2. Means for slidably supporting a seat or the like comprising a track element having an upstanding web, a carriage element rollably supported upon the track element and having a downwardly extending web overlapping the track web, anti-friction rollers carried by one of said webs and engaging slots formed in the other to rollably support the carriage and limit travel thereof, said track having notches along the top portion thereof, a dog carried by the carriage and having a portion movable into and out of engagement with any of said notches to releasably hold the carriage element with respect to the track element, and operating means for said dog comprising an operating shaft carried by and near one end of the carriage element and rockable about an axis transverse to the path of travel of said element, and link means connecting said dog and operating shaft.

3. Means for supporting a seat or the like, as set forth in claim 2, in which said operating shaft is rockable through a relatively short arc to operate said dog, and mounting means for said operating shaft including a bracket portion and inter-engaging holding portions carried partly by said shaft and partly by said bracket portion, said portions being engageable and disengageable when said shaft is turned to an angular position outside its normal angular path of operative movement, said dog and link means restraining said shaft against rotation beyond its usual path of rotative movement and so preventing disengagement of said holding portions.

4. Means as set forth in claim 2 in which said operating shaft is rockable through a relatively short arc to operate said dog, and mounting means for said operating shaft comprising a U-bracket having one leg secured to and extending from the side of the carriage element, said shaft extending through both legs of said bracket and into the carriage element, and spring means and an operating lever connected to said shaft and housed within said bracket.

WALTER S. SAUNDERS.
THOMAS A. McGREGOR.